Figures 1, 2, 3, 4:
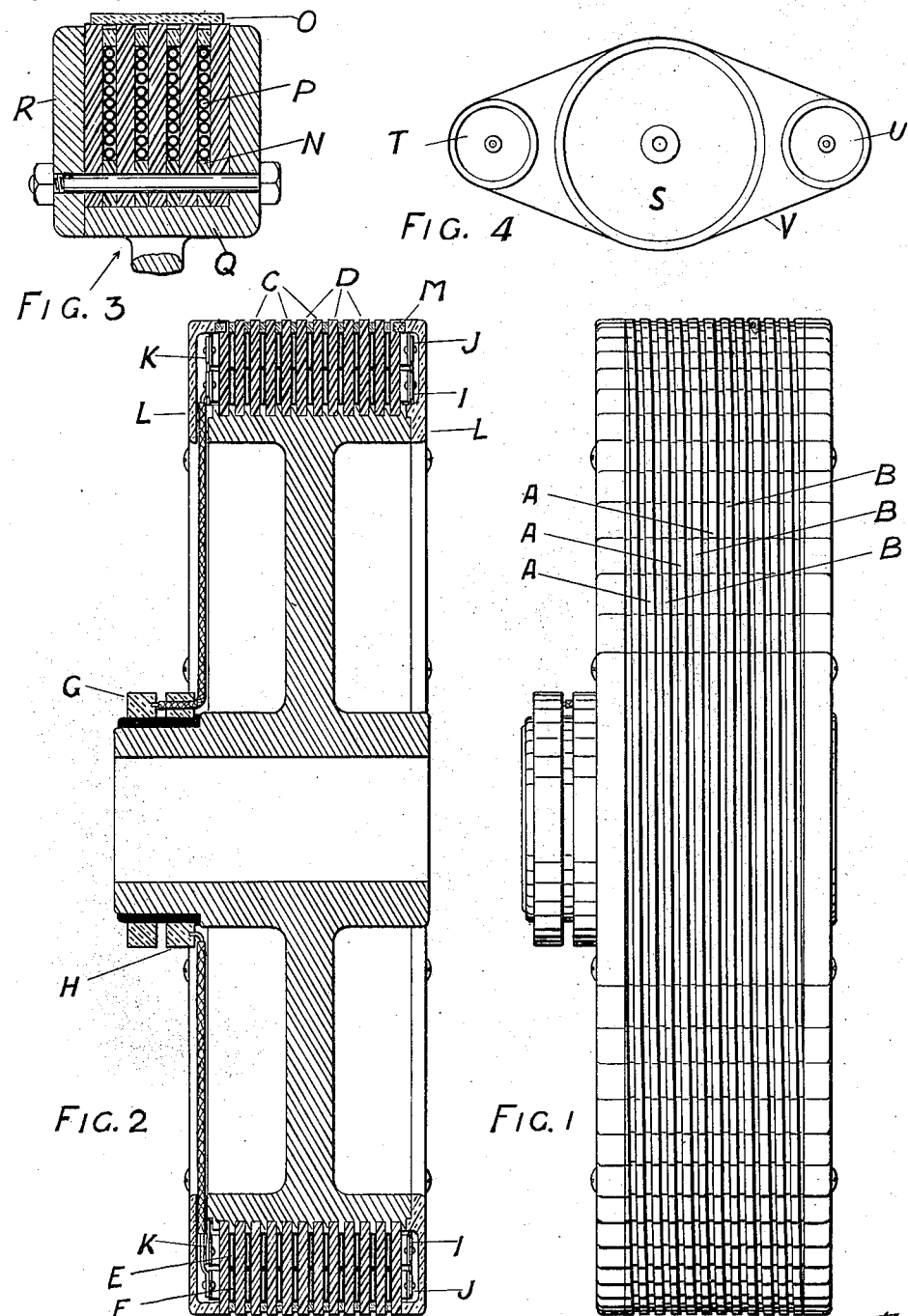

P. L. WESTON.
MAGNETIC BELTING.
APPLICATION FILED MAR. 6, 1917.

1,263,300.

Patented Apr. 16, 1918.

Inventor
Percy Leonard Weston,
by Wilkinson, Guista & MacKaye
Attorneys

UNITED STATES PATENT OFFICE.

PERCY LEONARD WESTON, OF BRISBANE, QUEENSLAND, AUSTRALIA.

MAGNETIC BELTING.

1,263,300.　　　　Specification of Letters Patent.　　Patented Apr. 16, 1918.

Application filed March 6, 1917. Serial No. 152,699.

*To all whom it may concern:*

Be it known that PERCY LEONARD WESTON, a subject of the King of the United Kingdom of Great Britain and Ireland, residing at Brisbane, in the State of Queensland, Commonwealth of Australia, has invented new and useful Improvements in Magnetic Belting, of which the following is a specification.

This invention relates to improvements in that form of power belting in which electromagnetic attraction is used to produce adhesion of a flat endless belt to the pulleys on which it runs. The object of my invention is to simplify the construction of such magnetic belting thereby reducing its cost and increasing its capacity and durability and to render it capable of operation at very high speeds.

In the means hitherto disclosed for securing efficient magnetic adhesion between the belting and the pulley, belting of considerable magnetic cross section has been employed, the necessary flexibility being at the same time secured by such devices as laminating the belt and attaching transverse strips of magnetic material.

In my invention I discard all such devices and complicated forms of belt construction and use plain steel or iron bands, sufficiently thin for purposes of flexiblity in conjunction with pulleys containing magnetic circuits so proportioned that adequate magnetic adhesion can be readily attained.

In order to accomplish this I construct the periphery of the pulleys with magnetic circuits so narrow that the width of the magnet limbs and pole faces is approximately twice the band thickness, while the winding space is only made of sufficient width to accommodate a single turn of conductor per layer.

Since the thickness of the band shall preferably not exceed approximately one six hundredth part of the diameter of the smallest pulley in order to avoid excessive bending stresses, the magnetic circuits in general are extremely narrow and in order to more readily achieve the practical construction of suitable pulleys I adopt a built up construction in which the pulley periphery is formed of iron or steel disks or segments, or preferably of strips of the requisite thickness wound on edge helically around the pulley, with narrow energizing coils sandwiched between the disk or strips.

In order to produce the required magnetizing effect of north and south poles alternately, the direction of the magnetizing current in one coil must be opposite to that in the adjoining coils so that in the helical arrangement two separate helices or any convenient multiple thereof will be required. The arrangement of placing the magnetizing coils in helical grooves is superior to the method of placing them in circumferential grooves in the matter of connecting up the various windings.

In the helical arrangement few connections are required and these can be readily made since the ends of the coils emerge from the ends of the pulley. The alternative arrangement of longitudinal grooves is inferior in that far more numerous connections are required and the grooves also impair the hoop strength of the pulley rim. The energizing electric current will be led into the pulleys by slip rings in the usual manner.

In general, suitably tempered steel bands will be used and these can be made endless by brazing or welding or preferably manufactured endless by rolling from a steel ring. By combining a plain steel band with helically wound pulleys as above described it is entirely feasible to operate at very high belt speeds and to transmit a very considerable power. For example, it has been found that a steel band one-sixtieth of an inch thick in contact with an arc of 145 degrees of a pulley ten inches in diameter running at four thousand revolutions per minute will transmit over two hundred horse power per inch width. Since increase of pulley diameter gives a proportionally greater length of arc of contact and also permits of a proportionally stronger band it follows that with a pulley fifty inches in diameter running at eight hundred revolutions per minute a band one inch wide would transmit one thousand horse power.

It is well known that plain steel bands can operate at speeds up to three hundred feet per second so that this form of gearing is very suitable for speed reduction of steam turbines, electric motors and other high speed machinery. In the case of direct current motors with shunt field winding a very convenient arrangement will be to connect the energizing coils of the pulleys in series with the motor field winding.

In cases where it is desired to gear one shaft to two others of higher speed, such for instance, as a marine propeller driven by high and low pressure turbines, I propose in lieu of two separate band drives to place the slow speed shaft between the two other shafts and use a common band passing over a pulley on each shaft. This arrangement should be so made that the aggregate length of the arcs of contact of the band on the central pulley should not be less than the aggregate length of the arcs of contact on the smaller pulleys in order to obtain the best results.

Reference is now made to the drawings in which:—

Figure 1, is an elevation of a magnetic pulley.

Fig. 2, a vertical section of Fig. 1.

Fig. 3, a section of pulley showing alternative method of constructing same.

Fig. 4, elevation of a central pulley geared to smaller pulleys by a common band.

The active surface of the pulley as shown in Fig. 1 is formed by a pair of narrow north and south pole faces A and B which run continuously around the pulley in helices resembling the threads of a double threaded screw.

C and D are wrought iron strips forming the magnet limbs or cores which are wound in the helical grooves formed on the body of the pulley and into which they may be secured by calking.

The energizing current is led into the windings through brushes which bear on the insulated slip rings G H. There are two complete windings E and F one in each helix and these are connected in series by the insulated rings I I; J J and K K. These end connections are protected by the end covers L. The windings are retained in the grooves by binding wires which may be of any suitable non-magnetic material such as bronze or non-magnetic steel. The ends of these binding wires are secured by bending the end into a hook fitting into a hole bored in the magnet core as shown at M.

S is a central pulley mounted upon a shaft and T and U smaller pulleys mounted upon independent shafts geared to central pulley by an endless band V.

Referring to Fig. 3, N are separate spacing disks or strips as an alternative to grooving the pulley. O is the band in position, and P insulated windings of which there are a greater number of layers than in Fig. 2. Q is the rim of the pulley and R a clamping plate, the whole being bolted together as shown.

What I claim as my invention, and desire to secure by Letters Patent is:—

1. In improvements in magnetic belting the combination of a plain flexible steel band and magnetic pulleys for the purpose of transmitting power, the said pulleys having their peripheries divided by helical grooves into magnetic circuits so proportioned that the magnetic flux of each circuit can be efficiently completed through the band alone, substantially as set forth.

2. In improvements in magnetic belting the combination of a plain flexible steel band and magnetic pulleys for the purpose of transmitting power, the periphery of the said pulleys containing narrow magnetic circuits built up of annular disks or segments or strips of steel on edge and narrow magnetizing windings therebetween, substantially as set forth.

3. In improvements in magnetic belting the combination of a plain flexible steel band and magnetic pulleys for the purpose of transmitting power, the periphery of the said pulleys being formed of narrow strips of steel on edge and narrow magnetizing windings therebetween, said strips and windings being wound in helices around the pulley, substantially as set forth.

4. In improvements in magnetic belting the combination of a plain flexible steel band and three magnetic pulleys for the purpose of transmitting power, the larger of the said pulleys being placed between the other two and the said band passing in common over the three pulleys.

In testimony whereof I have signed my name to this specification in the presence of two subscribing witnesses.

PERCY LEONARD WESTON.

Witnesses:
 E. GARLAND ABELL,
 OLIVE K. ABELL.